No. 629,721. Patented July 25, 1899.
W. W. G. HURT.
TONGUE SUPPORT.
(Application filed May 10, 1899.)
(No Model.)
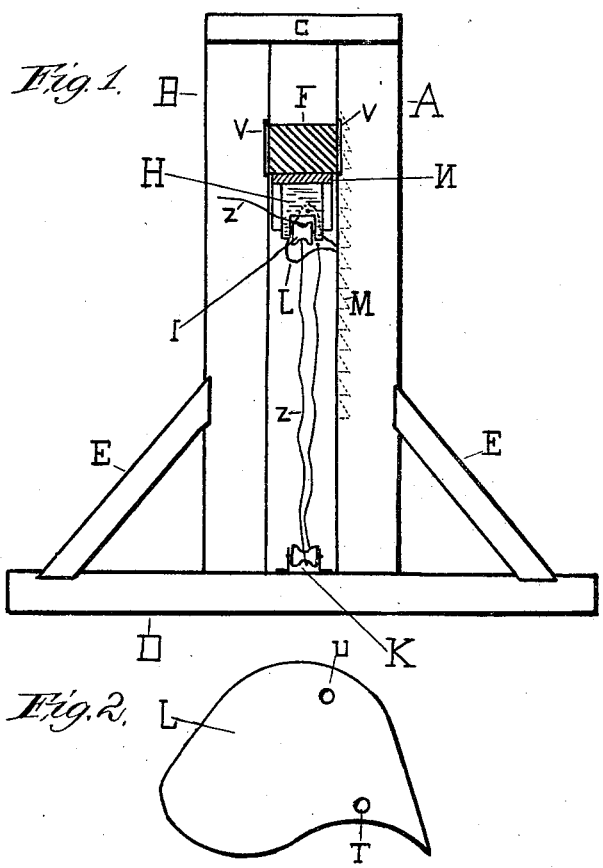
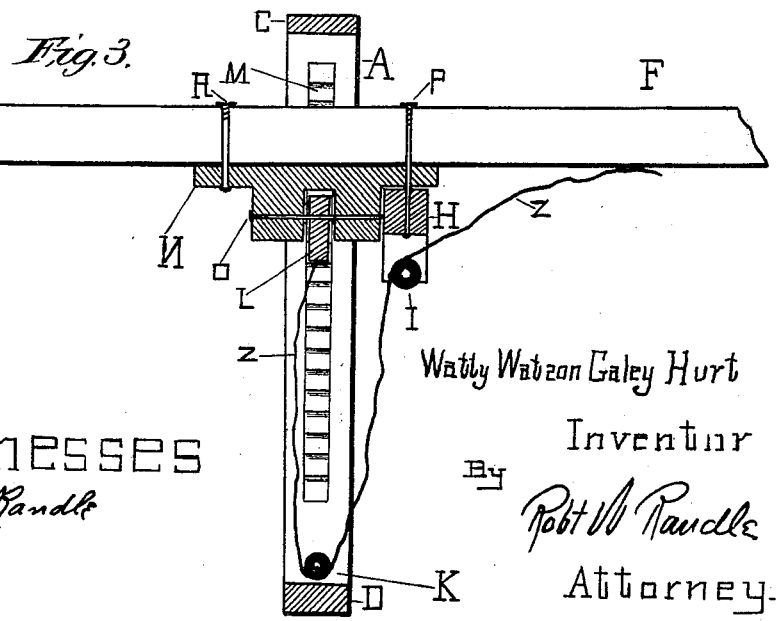
Witnesses
Rena E Randle
Robert D Hearn.
Watly Watson Galey Hurt
Inventor
By
Robt W Randle
Attorney

UNITED STATES PATENT OFFICE.

WATTY WATSON GALEY HURT, OF COIN, IOWA.

TONGUE-SUPPORT.

SPECIFICATION forming part of Letters Patent No. 629,721, dated July 25, 1899.

Application filed May 10, 1899. Serial No. 716,192. (No model.)

*To all whom it may concern:*

Be it known that I, WATTY WATSON GALEY HURT, a citizen of the United States, residing at Coin, in the county of Page and State of Iowa, have invented certain new and useful Improvements in Tongue-Supports for Reaping-Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in tongue-supports, and particularly to a tongue-support for reaping-machines and other agricultural and analogous machines where the weight is inclined to rest on the animals used in propelling the machine when the machine is not in motion and particularly when the driver is not in his place on the machine.

The objects and advantages of this invention will appear in the following description, and the novel features thereof will be particularly pointed out in the appended claims.

In the drawings, Figure 1 is a view of the device as it would appear from the driver's seat on the machine. Fig. 3 is a side view of the same, showing a part in section. Fig. 2 is a detail view of the pawl for securing the device in the position desired.

Similar letters of reference indicate corresponding parts in all the figures of the drawings.

A and B indicate the two upright posts, adapted to receive the tongue of the machine between them.

F represents the tongue of a machine.

C represents a cross-piece uniting A and B at the top.

D represents a cross-piece uniting A and B at the bottom and extending out beyond A and B and provided with braces E on either side.

N is a casting secured to the tongue F by the bolts R and P. H is also a casting secured to N and to the tongue F by the bolt P, as shown. The casting H is forked, and between the forks is secured a pulley I.

L is a pawl pivoted in the forks of the casting N and secured by bolt O. The inside face of A is provided with a rack or teeth M, in which the pawl L engages.

K is a pulley secured in the center and on the top of D.

Z represents a cord or wire secured in the hole T, extending down to the pulley K and thence up to the pulley I, thence along the tongue to the driver's seat. The bolt O passes through the hole U in the pawl L and is so placed that the point of the pawl is always in contact with the rack M when the cord Z is loose. Guides V are secured on each side of the tongue F, so that the device will move up or down, and the device will thus be retained in its proper place on the tongue. It will now be seen that if the driver should pull on the cord Z the device will slide up between the guides V and the pulleys K and I will be brought near together, and in this position the device can be carried while the machine is in motion. Should it be desired to stop the machine for a time, the driver will release the cord Z and allow the piece D to rest on the ground, and when the weight of the driver is removed from the machine the pawl L will engage in the rack M, and the weight of the tongue will thus rest on the device, and thus relieve the animals attached to the machine from the weight that would otherwise be transferred to them.

Having described my invention, what I claim, and desire to secure by Letters Patent, is—

1. In a device of the class described, the combination with a supporting-frame and a rack or teeth along the inside face of one of its side pieces, of a pawl pivoted between said side pieces and adapted to engage in the rack, of two or more pulleys, one secured to the under side of the tongue of a machine the other secured near the bottom of the device, a cord attached to the pawl and extending over the pulleys and along the tongue of the machine, all as described and for the purposes set forth.

2. In a tongue-support for reaping-machines, of two parallel bars A, and B, framed to the cross-pieces C, and D, of the castings N and H, secured to the under side of the tongue of the machine, of a cord Z, and pulleys K and I, for raising and lowering the device, and a pawl L, for securing the device in the position desired, all as described and for the purposes specified.

In testimony whereof I affix my signature in presence of two witnesses.

WATTY WATSON GALEY HURT.

Witnesses:
T. H. BALDWIN,
JO. H. FOWLER.